US012587871B2

(12) United States Patent　　　(10) Patent No.:　US 12,587,871 B2
Tan et al.　　　　　　　　　　　　(45) Date of Patent:　　Mar. 24, 2026

(54) NETWORK CONFIGURATION METHOD AND APPARATUS, COMPUTER DEVICE, AND STORAGE MEDIUM

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Hongbiao Tan, Zhuhai (CN); Dechao Song, Zhuhai (CN); Jie Tang, Zhuhai (CN); Hongwei Xu, Zhuhai (CN); Xilin Li, Zhuhai (CN); Guangzhi Qin, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

( * ) Notice: Subject to any disclaimer, the term of this patent is extended or adjusted under 35 U.S.C. 154(b) by 347 days.

(21) Appl. No.: 18/259,992

(22) PCT Filed: Sep. 30, 2021

(86) PCT No.: PCT/CN2021/122306
§ 371 (c)(1),
(2) Date: Jun. 29, 2023

(87) PCT Pub. No.: WO2022/151768
PCT Pub. Date: Jul. 21, 2022

(65) Prior Publication Data
US 2024/0381119 A1　　　Nov. 14, 2024

(30) Foreign Application Priority Data

Jan. 14, 2021　(CN) .......................... 202110048364.7

(51) Int. Cl.
*H04W 24/00*　　(2009.01)
*H04L 41/0816*　　(2022.01)
(Continued)

(52) U.S. Cl.
CPC ......... *H04W 24/02* (2013.01); *H04L 41/0816* (2013.01); *H04L 41/082* (2013.01); *H04W 84/18* (2013.01)

(58) Field of Classification Search
None
See application file for complete search history.

(56) References Cited

U.S. PATENT DOCUMENTS 9,123,186 B2 * 9/2015 Ricci ................... G06Q 30/0265
2018/0041387 A1 * 2/2018 Tan ..................... H04L 12/4625

FOREIGN PATENT DOCUMENTS

CN 　103415061 A 　11/2013
CN 　106131846 A * 11/2016 ............ H04W 48/14
(Continued)

OTHER PUBLICATIONS

Office Action mailed Sep. 23, 2021, in corresponding Chinese application No. 202110048364.7, filed Jan. 14, 2021, 11 pages.
(Continued)

*Primary Examiner* — Gerald A Smarth
(74) *Attorney, Agent, or Firm* — Christensen O'Connor Johnson Kindness PLLC

(57) ABSTRACT

The present disclosure relates to a network configuration method and a network configuration apparatus, a computer device, and a storage medium. The method includes: sending a network configuration request; acquiring a response signal; acquiring a preset network configuration level of a current intelligent device, if a signal intensity corresponding to the response signal is greater than or equal to a preset signal intensity; and acquiring network configuration infor- (Continued)

mation according to the preset network configuration level. The network configuration information is used for configuring a network with a router. When the network configuration is performed for various intelligent devices based on the method, the network configuration can be performed according to the preset network configuration level set by a user, thereby meeting personalized network configuration requirements of the user.

12 Claims, 2 Drawing Sheets

(51) Int. Cl.
| | | |
|---|---|---|
| *H04L 41/082* | (2022.01) | |
| *H04W 24/02* | (2009.01) | |
| *H04W 84/18* | (2009.01) | |

(56) References Cited

FOREIGN PATENT DOCUMENTS

| | | | | | |
|---|---|---|---|---|---|
| CN | 106604327 | A | * | 4/2017 | ........... H04W 84/12 |
| CN | 105050288 | B | | 10/2017 | |
| CN | 107466086 | A | | 12/2017 | |
| CN | 107846370 | A | | 3/2018 | |
| CN | 109194552 | A | | 1/2019 | |
| CN | 110007615 | A | | 7/2019 | |
| CN | 111479272 | A | | 7/2020 | |
| CN | 111629423 | A | | 9/2020 | |
| CN | 111741513 | A | | 10/2020 | |
| CN | 111867001 | A | | 10/2020 | |
| CN | 112188488 | A | | 1/2021 | |
| CN | 112910748 | A | | 6/2021 | |
| EP | 3174250 | A1 | * | 5/2017 | ............. H04W 4/08 |
| WO | WO-2020223854 | A1 | * | 11/2020 | ............ G05B 19/04 |

OTHER PUBLICATIONS

Notice of Grant mailed Nov. 24, 2021, in corresponding Chinese application No. 202110048364.7, filed Jan. 14, 2021, 6 pages.

International Search Report and Written Opinion mailed Jan. 4, 2022, issued in corresponding International Application No. PCT/CN2021/122306, filed Sep. 30, 2021, 12 pages.

Lihong, Q., et al., "Design and Implementation of Android Platform-Based Smart Home Client," Computer Applications and Software, vol. 33, No. 9, Sep. 2016, 5 pages.

Extended European Search Report mailed May 15, 2024, issued in corresponding Application No. EP 21918959.4, filed Sep. 30, 2021, 6 pages.

* cited by examiner

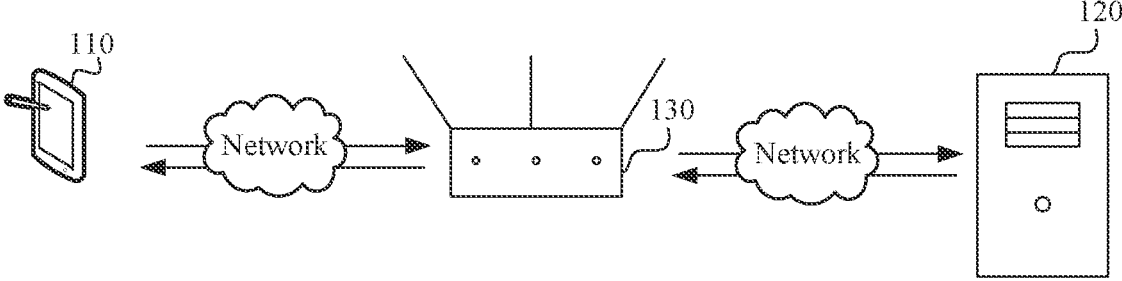

FIG. 1

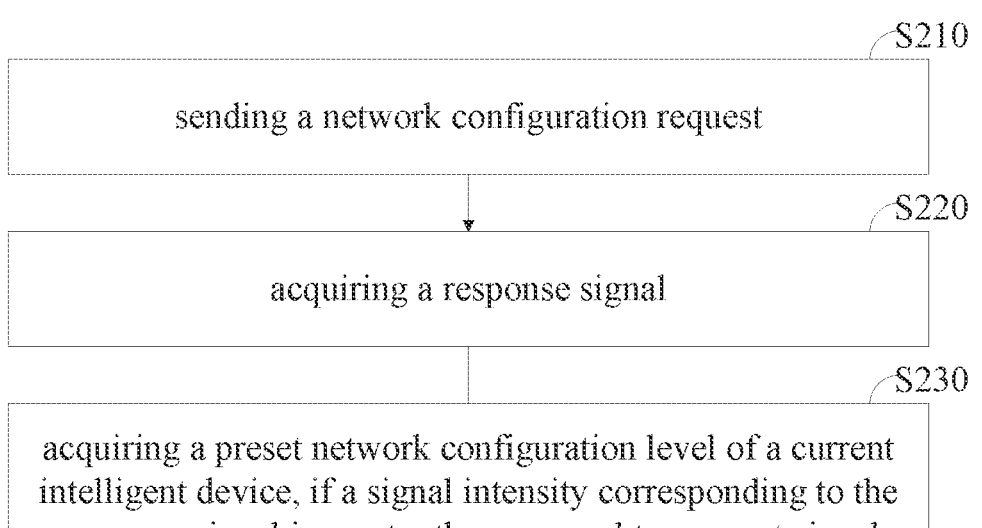

S210 sending a network configuration request

S220 acquiring a response signal

S230 acquiring a preset network configuration level of a current
intelligent device, if a signal intensity corresponding to the
response signal is greater than or equal to a preset signal
intensity

S240 acquiring network configuration information according to the
preset network configuration level, where the network
configuration information is used for configuring a network
with a router

FIG. 2

NETWORK CONFIGURATION METHOD AND APPARATUS, COMPUTER DEVICE, AND STORAGE MEDIUM

This application is a National Stage of International Application No. PCT/CN2021/122306, filed Sep. 30, 2021, which claims the priority of Chinese Patent Application No. 202110048364.7, filed on Jan. 14, 2021, entitled "Network Configuration Method and Apparatus, Computer Device, and Storage Medium", the disclosures of which are hereby incorporated by reference herein in their entirety.

TECHNICAL FIELD

The present disclosure relates to the field of computer technology, and more particularly, to a method and an apparatus of network configuration, a computer device, and a storage medium.

BACKGROUND

With the rapid development of the Internet, various types of household appliances and daily necessities become more and more intelligent. The intelligent devices usually need to establish connections with a router. However, in the prior art, factors influencing network configuration between the intelligent devices and the router include the influences of the distance, the network, etc. The order and mode of network configuration of various intelligent devices cannot be determined based on user preferences. The personalized needs of users cannot be satisfied.

SUMMARY

To resolve the technical problem in the prior art that the network configuration of intelligent devices cannot meet personalized needs of users, the present application provides a network configuration method and a network configuration apparatus, a computer device, and a storage medium.

In a first aspect, the present disclosure provides a network configuration method, including:

sending a network configuration request;

acquiring a response signal;

acquiring a preset network configuration level of a current intelligent device, if a signal intensity corresponding to the response signal is greater than or equal to a preset signal intensity;

acquiring network configuration information according to the preset network configuration level, wherein the network configuration information is used for configuring a network with a router.

In an embodiment, the preset network configuration level includes the first level, and the acquiring the network configuration information according to the preset network configuration level includes:

acquiring the network configuration information sent by the router, if the preset network configuration level is the first level.

In an embodiment, the preset network configuration level includes the second level, and a configuration priority corresponding to the second level is lower than a configuration priority corresponding to the first level, and the acquiring the network configuration information according to the preset network configuration level includes:

acquiring network configuration information sent by at least one of the router and a first intelligent device, if the preset network configuration level is the second level, where the first intelligent device is an intelligent device for which the network configuration is performed successfully.

In an embodiment, after the acquiring the network configuration information according to the preset network configuration level, the method further includes:

sending the network configuration information to an intelligent device corresponding to the network configuration request, if the network configuration request is detected.

In an embodiment, the method further includes:

sending device information of the current intelligent device to a mobile terminal through the router, when the network configuration of the current intelligent device is completed.

In an embodiment, after the acquiring the response signal, the method further includes:

performing a step of sending the network configuration request, if the signal intensity corresponding to the response signal is less than the preset signal intensity.

In an embodiment, after the acquiring the network configuration information according to the preset network configuration level, the method further includes:

updating the preset network configuration level according to a modified network configuration level, when the modified network configuration level is received, where the modified network configuration level is used to determine a configuration priority of the current intelligent device in a next network configuration.

In a second aspect, the present disclosure provides a network configuration apparatus, including:

a request sending module, configured to send a network configuration request;

a signal receiving module, configured to acquire a response signal;

a level determination module, configured to acquire a preset network configuration level of a current intelligent device, if a signal intensity corresponding to the response signal is greater than or equal to a preset signal intensity;

a network configuration module, configured to acquire network configuration information according to the preset network configuration level, wherein the network configuration information is used for configuring a network with a router.

A computer device is provided, and includes a memory, a processor, and a computer program stored in the memory and runnable in the processor. The processor, when executing the computer program, performs the following steps:

sending a network configuration request;

acquiring a response signal;

acquiring a preset network configuration level of a current intelligent device, if a signal intensity corresponding to the response signal is greater than or equal to a preset signal intensity;

acquiring network configuration information according to the preset network configuration level, wherein the network configuration information is used for configuring a network with a router.

A computer readable storage medium is provided, and has a computer program stored thereon. The computer program, when executed by a processor, causes the processor to perform the following steps:

sending a network configuration request;

acquiring a response signal;

acquiring a preset network configuration level of a current intelligent device, if a signal intensity corresponding to the response signal is greater than or equal to a preset signal intensity;

acquiring network configuration information according to the preset network configuration level, where the network configuration information is used for configuring a network with a router.

The network configuration method, the network configuration apparatus, the computer device, and the storage medium are provided above. The method includes: sending a network configuration request; acquiring a response signal; acquiring a preset network configuration level of a current intelligent device, if a signal intensity corresponding to the response signal is greater than or equal to a preset signal intensity; and acquiring network configuration information according to the preset network configuration level, where the network configuration information is used for configuring a network with a router. When the network configuration is performed for various intelligent devices based on the method, the network configuration can be performed according to the preset network configuration levels set by a user, thereby meeting the personalized network configuration requirements of the user.

BRIEF DESCRIPTION OF THE DRAWINGS

The accompanying drawings are incorporated into the specification and form a part of the specification, showing embodiments in accordance with the present invention, and together with the specification, used to explain the principles of the present invention.

In order to explain the technical solutions in the embodiments of the present invention or the prior art more explicitly, a brief introduction will be given below for the accompanying drawings required for describing the embodiments or the prior art. Obviously, for those of ordinary skill in the art, other accompanying drawings may also be obtained according to these accompanying drawings without making inventive efforts.

FIG. 1 is an application environment diagram of a network configuration method according to an embodiment;

FIG. 2 is a schematic flow diagram of the network configuration method according to an embodiment;

DETAILED DESCRIPTION OF THE EMBODIMENTS

Figure 3:
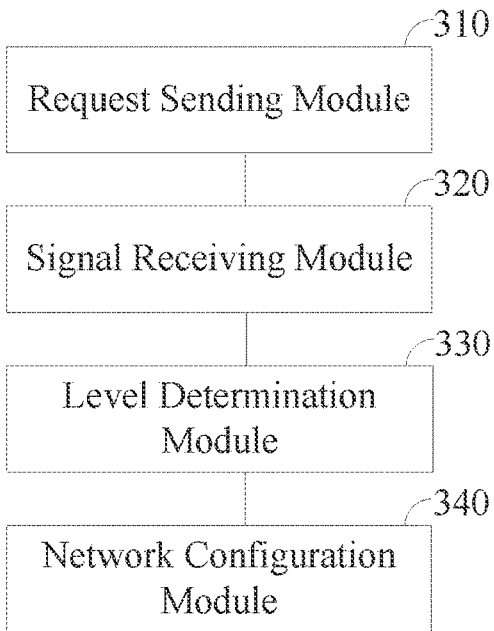
FIG. 3 is a block diagram illustrating a structure of a network configuration apparatus according to an embodiment.

To make the purpose, technical solutions, and advantages of the embodiments of the present disclosure clearer, the technical solutions of the embodiments of the present disclosure will be described clearly and completely hereinafter by combining the accompanying drawings of the embodiments of the present disclosure. Obviously, the embodiments described herein are merely some but not all embodiments of the present disclosure. Based on the embodiments of the present disclosure, other embodiments may be obtained by a person of ordinary skill in the art without involving any creative efforts, and these embodiments shall fall within the scope of protection of the present disclosure.

FIG. 1 is an application environment diagram of a network configuration method according to an embodiment.

Referring to FIG. 1, the network configuration method is applied to a network configuration system. The network configuration system includes a terminal 110, an intelligent device 120, and a router 130. The terminal 110 achieves remote control of the intelligent device 120 by calling the router 130. The terminal 110 may specifically be a desktop terminal or a mobile terminal. The mobile terminal may specifically be at least one of a mobile phone, a tablet computer, a notebook computer, and the like. The intelligent device 120 may be any smart home device, and may specifically be at least one of a smart speaker, a smart television, a smart air conditioner, a smart refrigerator, and the like. The router 130 serves as a gateway between networks and is a dedicated intelligent network device that reads the address in each data packet and then decides how to transmit the address.

In an embodiment, FIG. 2 is a schematic flow diagram of the network configuration method according to an embodiment. With reference to FIG. 2, the network configuration method of is provided. This embodiment is mainly exemplified by applying the method to the intelligent device 120 in FIG. 1. The network configuration method includes the following steps.

At step S210, a network configuration request is sent.

Specifically, after each power-off and restart, the intelligent device needs to perform the network configuration again. After power-up, the intelligent device to be configured sends the network configuration request and device information in real time through broadcasting. The device information includes a device name, a device state, and the like. The network configuration request is used to request a router or any other intelligent device to send network configuration information to the current intelligent device.

At step S220, a response signal is acquired.

Specifically, the response signal includes a first response signal and a second response signal. The first response signal includes a Bluetooth connection signal sent by at least a router to the current intelligent device. The second response signal includes a Bluetooth connection signal sent by at least one intelligent device to the current intelligent device.

At step S230, a preset network configuration level of a current intelligent device is acquired, if a signal intensity corresponding to the response signal is greater than or equal to a preset signal intensity.

Specifically, it is determined whether data may be transmitted stably according to the signal intensity corresponding to the response signal. The preset signal intensity is a signal intensity that ensures a normal data transmission of the current intelligent device. If the signal intensity corresponding to the response signal is less than the preset signal intensity, it indicates that the current intelligent device cannot transmit data to the router or other intelligent devices stably. If the signal intensity corresponding to the response signal is greater than or equal to the preset signal intensity, it indicates that the current intelligent device may stably transmit data to the router or other intelligent devices, so that the preset network configuration level of the current intelligent device is acquired. The preset network configuration level determines a network configuration priority of the current intelligent device, that is, a turn of the current intelligent device in a network configuration order of a plurality of intelligent devices. If it will be the first time that the network of the current intelligent device has been configured, the preset network configuration level is a default network configuration level. If it will not be the first time that the network of the current intelligent device has been configured, the preset network configuration level is a network configuration level set by the user through a mobile terminal.

At step S240, network configuration information is acquired according to the preset network configuration level, and the network configuration information is used for configuring a network with a router.

Specifically, the network configuration information is sequentially acquired according to a network configuration priority corresponding to the preset network configuration level, that is, the intelligent device with the highest network configuration priority first acquires the network configuration information sent by the router through Bluetooth. The network configuration information is sequentially sent to each intelligent device according to the network configuration priority. The network configuration information includes a gateway address and a gateway password of the router. The intelligent device which has acquired the network configuration information sends the gateway password to the router for verification of the network configuration, thereby meeting the personalized network configuration requirements of a user.

In an embodiment, the preset network configuration level includes the first level, and network configuration information sent by the router is acquired, if the preset network configuration level is the first level.

Specifically, the preset network configuration level includes the first level, and the first level is a top network configuration priority. The intelligent device belonging to the first level may preferentially receive the network configuration information sent by the router to become the intelligent device, for which a network configuration is performed first.

In an embodiment, the preset network configuration level includes the second level, a configuration priority corresponding to the second level is lower than a configuration priority corresponding to the first level, and the network configuration information sent by the router and/or a first intelligent device is acquired, if the preset network configuration level is the second level. The first intelligent device is the intelligent device, for which the network configuration is performed successfully.

Specifically, the preset network configuration level includes the second level. The preset network configuration level may further include a level other than the first level and the second level, and the level may be customized according to a preference of the user. The first level and the second level are network configuration levels set by the user through the mobile terminal when the network configurations of the intelligent devices have been completed for the first time, and are sent to each intelligent device through the router, so that a network configuration of each intelligent device will be performed next time according to the network configuration levels set by the user. The intelligent device belonging to the second level receives the network configuration information sent by the router or the network configuration information sent by the intelligent device of the first level after the network configuration of the intelligent device of the first level was completed. That is, the intelligent device of each network configuration level can receive the network configuration information sent by the router and other intelligent devices, whose network configurations have been successfully performed. The network configuration is performed according to the network configuration information acquired priorly, thereby improving the efficiency of network configuration.

In another embodiment, the router only sends the network configuration information to the intelligent devices of the first level, and the intelligent devices of other levels receive the network configuration information sent by the intelligent devices, whose network configurations have been completed, thereby forming a Bluetooth network. The intelligent devices, whose network configurations have been completed, send the network configuration information to the intelligent devices, whose network configurations are not performed, thereby reducing the data processing pressure of the router.

In an embodiment, after the acquiring the network configuration information according to the preset network configuration level, the network configuration information is sent to an intelligent device corresponding to the network configuration request, if the network configuration request is detected.

Specifically, after the network configuration of the current intelligent device was completed, it is detected whether the network configurations of other surrounding intelligent devices have been performed. If the network configuration request is detected, it indicates that there is an intelligent device whose network configuration is not performed. Then the network configuration information is sent to the intelligent device corresponding to the network configuration request, so that a network configuration is performed for the intelligent device, whose network configuration is not performed. Each intelligent device, whose network configuration is completed, detects whether the network configurations of the surrounding intelligent devices have been completed or not, and the detection does not end until no network configuration requests are detected for all the intelligent devices, which indicates that the network configurations of all intelligent devices have been completed.

In an embodiment, device information of the current intelligent device is sent to a mobile terminal through the router, when the network configuration of the current intelligent device is completed.

Specifically, when the network configuration of the intelligent device is completed, the corresponding device information is sent to a mobile terminal through the router, so that the user knows which intelligent device whose network configuration has been completed. The device information includes a device name and a device state. If it is the first time that the network configuration has been performed, the intelligent device, whose network configuration has been competed, is displayed in the mobile terminal, while the intelligent device, whose network configuration is not completed, will not be displayed in the mobile terminal, so that the user knows the network configuration situation of each intelligent device according to the display in the mobile terminal. If it is not the first time that the network configuration has been performed, all intelligent devices are displayed in the mobile terminal, but the device states of intelligent devices are different. In this case, the intelligent device, whose network configuration is completed, sends the device information to the mobile terminal, and the device state of the corresponding intelligent device in the mobile terminal is updated according to the device state in the device information by changing a state from a completed-network-configuration state to an uncompleted-network-configuration state. At this time, the user may determine the network configurations of which intelligent devices have been completed and the network configurations of which intelligent devices have not been completed according to the device states.

In an embodiment, after the acquiring the response signal, the step of sending the network configuration request is performed, if the signal intensity corresponding to the response signal is less than the preset signal intensity.

Specifically, if the signal intensity of the response signal is less than the preset signal intensity, it indicates that the current intelligent device cannot stably transmit data to the router or other intelligent devices. In this case, the current intelligent device refuses to establish a Bluetooth connection channel with the router or the other intelligent devices that do not meet the requirement of the signal intensity, and the network configuration information is continuously sent till the signal intensity of the received response signal is greater than or equal to the preset signal intensity. Then, a Bluetooth connection channel is established between the current intelligent device and the router or the other intelligent devices that meet the requirement of the signal intensity, and the subsequent network configuration continues.

In an embodiment, after the acquiring the network configuration information according to the preset network configuration level, the preset network configuration level is updated according to a modified network configuration level when the modified network configuration level is received. The modified network configuration level is used to determine a configuration priority of the current intelligent device in a next network configuration.

Specifically, after the network configuration is completed, when the modified network configuration level is received, it indicates that the user has modified the network configuration level of the current intelligent device in the mobile terminal. Then, the preset network configuration level is updated according to the modified network configuration level. When the network configuration of the intelligent device will be performed next time, the network configuration is performed according to the network configuration level modified by the user for each intelligent device, thereby meeting the personalized network configuration requirements of the user.

FIG. 2 is a schematic flow diagram of the network configuration method according to an embodiment. It should be understood that although the steps in the flowchart in FIG. 2 are shown in an order indicated by arrows, the steps are not necessarily performed in the order indicated by the arrows. Unless explicitly stated in the present disclosure, there is no strict order in which these steps are performed, and the steps may be performed in any other order. Furthermore, at least part of the steps in FIG. 2 may include multiple sub-steps or multiple stages. These sub-steps or stages are not necessarily performed at the same time, but may be performed at different times. These sub-steps or stages are not necessarily performed in order, but may be performed in turn or alternately with at least part of other steps, or sub-steps or stages of the other steps.

In an embodiment, as shown in FIG. 3, a network configuration apparatus is provided. The network configuration apparatus includes:

a request sending module 310, configured to send a network configuration request;

a signal receiving module 320, configured to acquire a response signal;

a level determination module 330, configured to acquire a preset network configuration level of a current intelligent device, if a signal intensity corresponding to the response signal is greater than or equal to a preset signal intensity; and a network configuration module 340, configured to acquire network configuration information according to the preset network configuration level, and the network configuration information is used for configuring a network with a router.

In an embodiment, the preset network configuration level includes the first level, and the network configuration module 340 includes:

a first network configuration unit, configured to acquire network configuration information sent by the router, if the preset network configuration level is the first level.

In an embodiment, the preset network configuration level includes the second level, a configuration priority corresponding to the second level is lower than a configuration priority corresponding to the first level, and the network configuration module 340 includes:

a second network configuration unit, configured to acquire the network configuration information sent by the router and/or a first intelligent device, if the preset network configuration level is the second level. The first intelligent device is the intelligent device, for which the network configuration has been performed successfully.

In an embodiment, the apparatus further includes:

a detection module, configured to send the network configuration information to an intelligent device corresponding to the network configuration request, if the network configuration request is detected.

In an embodiment, the apparatus further includes:

an information sending module, configured to send device information of the current intelligent device to a mobile terminal through the router, when the network configuration of the current intelligent device is completed.

In an embodiment, the request sending module 310 is further configured to:

perform the step of sending the network configuration request, if the signal intensity corresponding to the response signal is less than the preset signal intensity.

In an embodiment, the apparatus further includes:

a level modification module, configured to update the preset network configuration level according to a modified network configuration level, when the modified network configuration level is received. The modified network configuration level is used to determine a configuration priority of the current intelligent device in a next network configuration.

Figure 4:
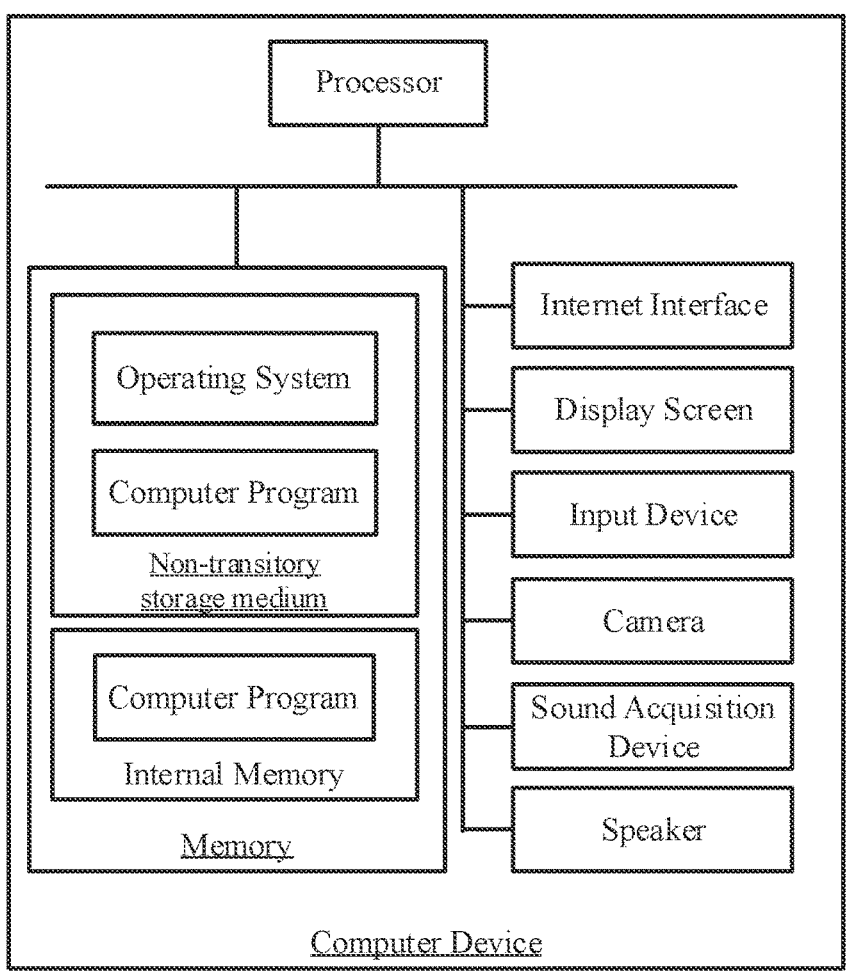
FIG. 4 is a diagram illustrating an internal structure of a computer device according to an embodiment.

FIG. 4 is a diagram illustrating an internal structure of a computer device according to an embodiment. The computer device may be, in particular, the intelligent device 120 of FIG. 1. As shown in FIG. 4, the computer device includes a processor, a memory, a network interface, an input device, and a display screen, which are connected through a system bus. The memory includes a non-transitory storage medium and an internal memory. The non-transitory storage medium of the computer device stores an operating system and may also store a computer program. The computer program, when executed by a processor, may cause the processor to perform the network configuration method. The internal memory may also store a computer program. The computer program, when executed by a processor, may cause the processor to perform the network configuration method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, a touchpad, a mouse or the like.

A person skilled in the art may understand that, the structure shown in FIG. 4 is merely a block diagram of partial structure related to a solution in this disclosure, and does not constitute a limitation to the computer device to which the solution in this disclosure is applied. Specifically, the computer device may include more or fewer components than those shown in the figure, or have some combined components, or have a different component arrangement.

In an embodiment, the network configuration apparatus provided in the present disclosure can be implemented in the form of a computer program that can run in a computer device shown in FIG. 4. The memory of the computer device may store various program modules, such as the request sending module 310, the signal receiving module 320, the level determination module 330, and the network configuration module 340 shown in FIG. 3, which make up the network configuration apparatus. The various program modules making up the computer program enable the processor to perform the steps described in each embodiment of the network configuration method of the present disclosure in this specification.

The computer device shown in FIG. 4 may perform sending a network configuration request through the request sending module 310 in the network configuration apparatus shown in FIG. 3. The computer device may perform acquiring a response signal through the signal receiving module 320. The computer device may perform, through the level determination module 330, acquiring a preset network configuration level of a current intelligent device, if a signal intensity corresponding to the response signal is greater than or equal to a preset signal intensity. The computer device may perform, through the network configuration module 340, acquiring network configuration information according to the preset network configuration level, where the network configuration information is used for configuring a network with a router.

In an embodiment, a computer device is provided, and the computer device includes a memory, a processor, and a computer program stored in the memory and runnable in the processor. The processor, when executing the computer program, performs following steps: sending a network configuration request; acquiring a response signal; acquiring a preset network configuration level of a current intelligent device, if a signal intensity corresponding to the response signal is greater than or equal to a preset signal intensity; and acquiring network configuration information according to the preset network configuration level, where the network configuration information is used for configuring a network with a router.

In an embodiment, the processor, when executing the computer program, further performs the following steps: the preset network configuration level including a first level, and acquiring network configuration information sent by the router, if the preset network configuration level is the first level.

In an embodiment, the processor, when executing the computer program, further performs the following steps: the preset network configuration level including a second level, a configuration priority corresponding to the second level being lower than a configuration priority corresponding to the first level, and acquiring the network configuration information sent by the router and/or a first intelligent device, if the preset network configuration level is the second level, where the first intelligent device is the intelligent device whose network configuration is performed successfully.

In an embodiment, the processor, when executing the computer program, further performs the following step: sending the network configuration information to an intelligent device corresponding to the network configuration request, if the network configuration request is detected.

In an embodiment, the processor, when executing the computer program, further performs the following step: sending device information of the current intelligent device to a mobile terminal through the router, when the network configuration of the current intelligent device is completed.

In an embodiment, the processor, when executing the computer program, further performs the following steps: performing the step of sending the network configuration request, if the signal intensity corresponding to the response signal is less than the preset signal intensity.

In an embodiment, the processor, when executing the computer program, further performs the following steps: updating the preset network configuration level according to a modified network configuration level, when the modified network configuration level is received, where the modified network configuration level is used to determine a configuration priority of the current intelligent device in a next network configuration.

In an embodiment, a computer readable storage medium is provided, and has a computer program stored thereon. The computer program, when executed by a processor, causes the processor to perform the following steps: sending a network configuration request; acquiring a response signal; acquiring a preset network configuration level of a current intelligent device, if a signal intensity corresponding to the response signal is greater than or equal to a preset signal intensity; and acquiring network configuration information according to the preset network configuration level, where the network configuration information is used for configuring a network with a router.

In an embodiment, the computer program, when executed by the processor, further causes the processor to perform the following steps: the preset network configuration level including a first level, and acquiring network configuration information sent by the router, if the preset network configuration level is the first level.

In an embodiment, the computer program, when executed by the processor, further causes the processor to perform the following steps: the preset network configuration level including a second level, a configuration priority corresponding to the second level being lower than a configuration priority corresponding to the first level, and acquiring the network configuration information sent by the router and/or a first intelligent device, if the preset network configuration level is the second level, where the first intelligent device is the intelligent device whose network configuration is performed successfully.

In an embodiment, the computer program, when executed by the processor, further causes the processor to perform the following steps: sending the network configuration information to an intelligent device corresponding to the network configuration request, if the network configuration request is detected.

In an embodiment, the computer program, when executed by the processor, further causes the processor to perform the following step: sending device information of the current intelligent device to a mobile terminal through the router, when the network configuration of the current intelligent device is completed.

In an embodiment, the computer program, when executed by the processor, further causes the processor to perform the following steps: sending device information of the current intelligent device to a mobile terminal through the router, upon completing a network configuration of the current intelligent device.

In an embodiment, the computer program, when executed by the processor, further causes the processor to perform the following steps: updating the preset network configuration level according to a modified network configuration level, when the modified network configuration level is received, where the modified network configuration level is used to determine a configuration priority of the current intelligent device in a next network configuration.

A person skilled in the art may understand that all or part of procedures of the method in the above embodiments may be performed by related hardware instructed by a computer program. The computer program may be stored in a non-transitory computer-readable storage medium. The computer program, when executed, may include the procedures in the embodiments of the method. Any reference to memory, storage, database or other medium used in each embodiment provided in the present disclosure may include non-transitory and/or transitory memories. The non-transitory memories may include a Read-Only Memory (ROM), a Programmable Read-Only Memory (PROM), an Electrically Programmable Read-Only Memory (EPROM), an Electrically Erasable Programmable Read-Only Memory (EEPROM) or a flash memory. The transitory memories may include a Random Access Memory (RAM) or an external cache memory. As an illustration rather than a limitation, the RAM is available in many forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM).

It should be noted that, relational terms such as "first" and "second" herein are only used to distinguish one entity or operation from another entity or operation, and do not necessarily require or imply that there is any such actual relationship or sequence between entities or operations. Moreover, the terms "include", "comprise" or any other variants thereof are intended to cover non-exclusive inclusion, so that a process, method, product, or device including a series of elements not only includes those elements, but also includes those that are not explicitly listed, or the inherent elements of the process, the method, the product, or the device. Without further limitations, the element defined by the expression "including a . . . " does not exclude the existence of other identical elements in the process, the method, the product, or the device that includes the element.

The above embodiments are only specific embodiments of the present invention, which enable those skilled in the art to understand or implement the present invention. Various modifications of these embodiments are obvious for those skilled in the art, and the general principles defined herein may be implemented in other embodiments without departing from the spirit or scope of the present disclosure. Therefore, the present invention will not be limited to the embodiments shown herein, but should conform to the widest scope consistent with the principles and novel features disclosed herein.

What is claimed is:

1. A network configuration method, applied to intelligent devices, wherein the method comprises:
   sending a network configuration request;
   acquiring a response signal;

acquiring a preset network configuration level of a current intelligent device when a signal intensity corresponding to the response signal is greater than or equal to a preset signal intensity, the preset network configuration level comprising a first level or a second level, a configuration priority corresponding to the second level being lower than a configuration priority corresponding to the first level; and acquiring network configuration information according to the preset network configuration level, comprising:
   acquiring network configuration information sent by the router when the preset network configuration level is the first level; and
   acquiring network configuration information sent by a first intelligent device when the preset network configuration level is the second level;
   wherein the network configuration information is used for configuring a network with a router; and
   wherein the first intelligent device is an intelligent device for which the network configuration is performed successfully.

2. The method of claim 1, wherein after the acquiring the network configuration information according to the preset network configuration level, the method further comprises:
   sending the network configuration information to an intelligent device corresponding to the network configuration request, when the network configuration request is detected.

3. The method of claim 1, further comprising:
   sending device information of the current intelligent device to a mobile terminal through the router, when the network configuration of the current intelligent device is completed.

4. The method of claim 3, wherein the device information comprises a device name and a device state, and the network configuration request is used to request the router or the first intelligent device to send the network configuration information to the current intelligent device.

5. The method of claim 1, wherein after the acquiring the response signal, the method further comprises:
   performing a step of sending the network configuration request, when the signal intensity corresponding to the response signal is less than the preset signal intensity.

6. The method of claim 1, wherein after the acquiring the network configuration information according to the preset network configuration level, the method further comprises:
   updating the preset network configuration level according to a modified network configuration level when the modified network configuration level is received, wherein the modified network configuration level is used to determine a configuration priority of the current intelligent device in a next network configuration.

7. A computer device, comprising a memory, a processor, and a computer program stored in the memory and runnable in the processor, wherein the processor, when executing the computer program, performs steps of the method of claim 1.

8. A non-transitory computer-readable storage medium, having a computer program stored thereon, wherein, the computer program, when executed by a processor, causes the processor to perform steps of the method of claim 1.

9. The method of claim 1, wherein:
   the response signal comprises a first response signal and a second response signal;
   the first response signal comprises a Bluetooth connection signal sent by at least the router to the current intelligent device; and

the second response signal comprises a Bluetooth connection signal sent by at least one intelligent device to the current intelligent device.

10. The method of claim 1, wherein:

the preset signal intensity is a signal intensity that ensures a normal data transmission of the current intelligent device; and the preset network configuration level determines a network configuration priority of the current intelligent device.

11. The method of claim 10, wherein:

an intelligent device with a highest network configuration priority first acquires the network configuration information sent by the router through Bluetooth;

the network configuration information is sequentially sent to each intelligent device according to the network configuration priority; and the network configuration information comprises a gateway address and a gateway password of the router.

12. The method of claim 1, wherein:

the first level and the second level are network configuration levels set by a user through a mobile terminal when network configurations of the intelligent devices have been completed for the first time; and the first level and the second level are sent to the intelligent devices through the router.

* * * * *